United States Patent
Lee et al.

(10) Patent No.: US 12,381,280 B2
(45) Date of Patent: Aug. 5, 2025

(54) BATTERY PACK HAVING IMPROVED COUPLING STRUCTURE, AND VEHICLE INCLUDING SAME

(71) Applicant: LG Energy Solution, Ltd., Seoul (KR)

(72) Inventors: Jung-Hoon Lee, Daejeon (KR); Doo-Han Yoon, Daejeon (KR); Jae-Hun Yang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 698 days.

(21) Appl. No.: 17/768,097

(22) PCT Filed: Oct. 22, 2020

(86) PCT No.: PCT/KR2020/014526
§ 371 (c)(1),
(2) Date: Apr. 11, 2022

(87) PCT Pub. No.: WO2021/137401
PCT Pub. Date: Jul. 8, 2021

(65) Prior Publication Data
US 2023/0216124 A1    Jul. 6, 2023

(30) Foreign Application Priority Data
Jan. 3, 2020   (KR) ................. 10-2020-0000995

(51) Int. Cl.
*H01M 50/242*   (2021.01)
*H01M 50/264*   (2021.01)
*B60L 50/64*    (2019.01)

(52) U.S. Cl.
CPC ....... *H01M 50/242* (2021.01); *H01M 50/264* (2021.01); *B60L 50/64* (2019.02)

(58) Field of Classification Search
CPC .... H01M 50/242; H01M 50/264; B60L 50/64
USPC ........................................... 429/156
See application file for complete search history.

(56) References Cited

U.S. PATENT DOCUMENTS

| 2003/0162091 A1 | 8/2003 | Watanabe et al. |
| 2008/0057393 A1 | 3/2008 | Onuki et al. |
| 2008/0100262 A1 | 5/2008 | Ozaki et al. |
| 2012/0214023 A1 | 8/2012 | Koh |
| 2014/0284125 A1 | 9/2014 | Katayama et al. |

(Continued)

FOREIGN PATENT DOCUMENTS

| CN | 102022410 A | 4/2011 |
| CN | 104183808 A | 12/2014 |

(Continued)

OTHER PUBLICATIONS

Extended European Search Report including Written Opinion for Application No. 20909860.7 dated Sep. 14, 2023, pp. 1-6.

(Continued)

*Primary Examiner* — James M Erwin
(74) *Attorney, Agent, or Firm* — Lerner David LLP

(57) ABSTRACT

Disclosed is a battery pack, which includes a module stack in which a plurality of battery modules are stacked; a pack housing having a lower housing configured to support the module stack at a lower side thereof and an upper housing coupled to the lower housing from an upper side of the module stack; and a plurality of displacement plates respectively coupled to inner sides of the lower housing and the upper housing to elastically press the module stack.

12 Claims, 9 Drawing Sheets

(56) References Cited

U.S. PATENT DOCUMENTS

| | | |
|---|---|---|
| 2014/0295235 A1 | 10/2014 | Jung |
| 2015/0064543 A1 | 3/2015 | Jung |
| 2015/0171389 A1 | 6/2015 | Ejima |
| 2015/0372355 A1* | 12/2015 | McLaughlin ..... H01M 10/6561 29/505 |
| 2017/0200925 A1 | 7/2017 | Seo et al. |
| 2017/0331079 A1 | 11/2017 | Yu et al. |
| 2017/0338526 A1* | 11/2017 | Poirier ................ H01M 10/482 |
| 2018/0175343 A1 | 6/2018 | Choi et al. |
| 2019/0020004 A1 | 1/2019 | Choi et al. |
| 2019/0058183 A1* | 2/2019 | Lee .................... H01M 50/271 |
| 2019/0267603 A1 | 8/2019 | Chi et al. |
| 2019/0386268 A1 | 12/2019 | Takahashi |
| 2020/0280035 A1 | 9/2020 | Park et al. |
| 2021/0016668 A1 | 1/2021 | Nakahara et al. |

FOREIGN PATENT DOCUMENTS

| | | |
|---|---|---|
| CN | 105304833 A | 2/2016 |
| CN | 206059459 U | 3/2017 |
| CN | 110050361 A | 7/2019 |
| JP | 2003-257391 A | 9/2003 |
| JP | 2008109494 A | 5/2008 |
| JP | 2008282625 A | 11/2008 |
| JP | 2013-105617 A | 5/2013 |
| JP | 2013-242967 A | 12/2013 |
| JP | 2015-115258 A | 6/2015 |
| JP | 2015-191763 A | 11/2015 |
| JP | 2018-170168 A | 11/2018 |
| JP | 2018-533825 A | 11/2018 |
| KR | 20080022485 A | 3/2008 |
| KR | 20090000302 A | 1/2009 |
| KR | 20120095775 A | 8/2012 |
| KR | 101209935 B1 | 12/2012 |
| KR | 20140118734 A | 10/2014 |
| KR | 20150024999 A | 3/2015 |
| KR | 20190007745 A | 1/2019 |
| KR | 20190095048 A | 8/2019 |
| KR | 2019-0118017 A | 10/2019 |
| WO | 2013-073464 A1 | 5/2013 |
| WO | 2019187315 A1 | 10/2019 |

OTHER PUBLICATIONS

International Search Report for Application No. PCT/KR2020/014526 mailed Feb. 2, 2021, 2 pages.

* cited by examiner

FIG. 3
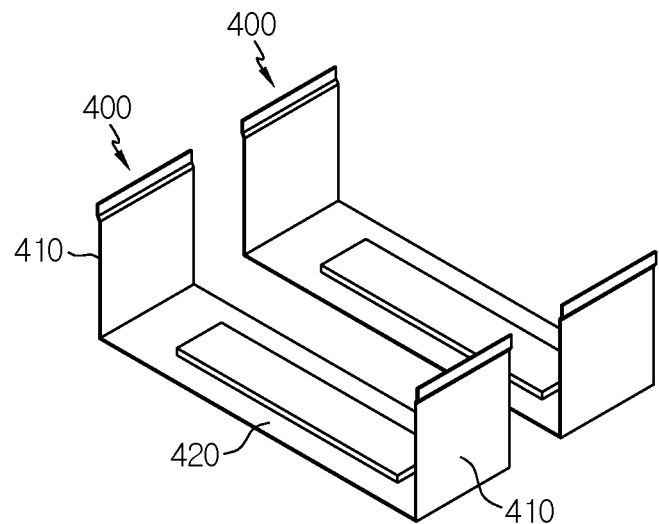
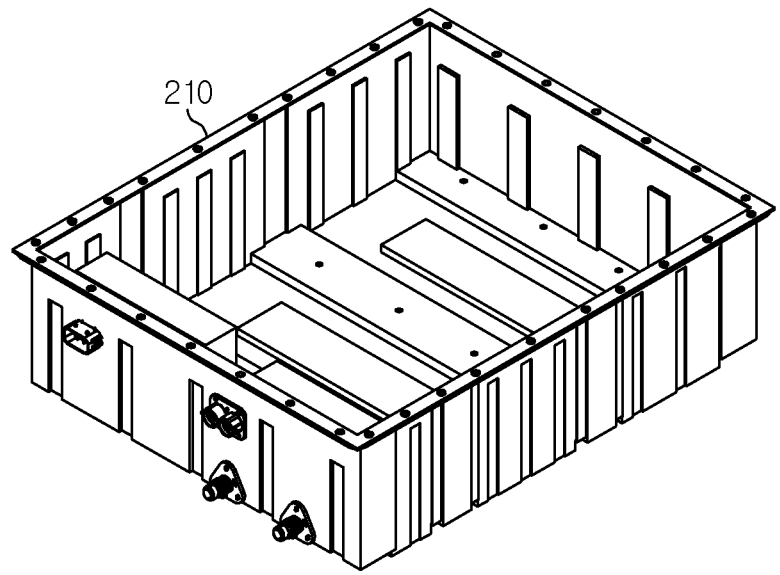

BATTERY PACK HAVING IMPROVED COUPLING STRUCTURE, AND VEHICLE INCLUDING SAME

CROSS-REFERENCE TO RELATED APPLICATIONS

The present application is a national stage entry under 35 U.S.C. § 371 of International Application No. PCT/KR2020/014526, filed on Oct. 22, 2020, published in Korean, which claims priority to Korean Patent Application No. 10-2020-0000995, filed on Jan. 3, 2020, the disclosures of which are incorporated herein by reference in their entireties.

TECHNICAL FIELD

The present disclosure relates to a battery pack having an improved coupling structure and a vehicle including the same, and more specifically, to a battery pack that may increase connection reliability and reduce cost by fastening a module stack and a pack housing together using a bolt to and also have a structure in which the pack housing may maintain a state of pressing the battery module to give an improved stability when vibration occurs in the battery pack, and a vehicle including the same.

BACKGROUND ART

A secondary battery easily applicable to various product groups and having electric characteristics such as high energy density is universally applied not only to portable devices but also to electric vehicles (EV) or hybrid electric vehicles (HEV) driven by an electric drive source. Such a secondary battery is attracting attention as a new energy source for environmental friendliness and energy efficiency improvement in that it does not generate by-products from the use of energy along with a primary advantage of dramatically reducing the use of fossil fuels.

Types of secondary batteries currently widely used in the art include lithium ion batteries, lithium polymer batteries, nickel cadmium batteries, nickel hydride batteries, nickel zinc batteries, and the like. The operating voltage of such a unit secondary battery cell, namely a unit battery cell, is about 2.5V to 4.5V. Therefore, if a higher output voltage is required, a battery pack may be configured by connecting a plurality of battery cells in series. In addition, the battery pack may be configured by connecting a plurality of battery cells in parallel according to the charge/discharge capacity demanded for the battery pack. Accordingly, the number of battery cells included in the battery pack may be variously set according to a required output voltage or charge/discharge capacity.

Meanwhile, when configuring a battery pack by connecting a plurality of battery cells in series/parallel, generally, a battery module including a plurality of battery cells is configured first, and a module stack formed by stacking a plurality of such battery modules is accommodated in a pack housing to configure the battery pack.

Accordingly, there is a need to reduce component cost and improve structural reliability by developing a battery pack having a structure in which the connection between a plurality of battery modules and between the module stack and the pack housing may be made as simple as possible. In addition, since vibration may occur at the battery pack, there is a demand to develop a battery pack with improved structural stability.

DISCLOSURE

Technical Problem

The present disclosure is designed to solve the problems of the related art, and therefore the present disclosure is directed to allowing the fastening between a plurality of battery modules and between a module stack formed by stacking a plurality of battery modules and a pack housing to be made as simple as possible, and also improving structural stability.

However, the technical problem to be solved by the present disclosure is not limited to the above, and other problems not mentioned herein will be clearly understood by those skilled in the art from the following description.

Technical Solution

In one aspect of the present disclosure, there is provided a battery pack, comprising: a module stack in which a plurality of battery modules are stacked; a pack housing having a lower housing configured to support the module stack at a lower side thereof and an upper housing coupled to the lower housing from an upper side of the module stack; and a plurality of displacement plates respectively coupled to inner sides of the lower housing and the upper housing to elastically press the module stack.

The displacement plate may include a pair of pressing plates configured to face an inner surface of a sidewall of the pack housing; and a connection plate configured to connect the pair of pressing plates to each other and provided to face a bottom surface of the pack housing.

The pressing plate may include a support portion disposed parallel to the inner surface in contact with the inner surface of the sidewall of the pack housing; a slope portion bent to extend from one end of the support portion toward an inside of the pack housing; and an elastic pressing portion configured to extend parallel to the support portion from one end of the slope portion away from the support portion and configured to press the module stack by an elastic restoring force, and the connection plate may connect a pair of elastic pressing portions to each other.

Each of the lower housing and the upper housing may include a support bead configured to protrude from an inner surface of the lower housing and the upper housing to face an inner surface of the elastic pressing portion in a state of being spaced apart therefrom.

A bent region between the slope portion and the elastic pressing portion may have a rounded shape.

The battery pack may further comprise a plurality of fastening bolts provided to penetrate through the pack housing and the module stack; and a plurality of weld nuts fixed to a lower surface of the lower housing and coupled with the fastening bolts.

The battery pack may further comprise an airtight plate assembly attached to the lower surface of the lower housing and configured to give an accommodation space for the weld nut.

The airtight plate assembly may include a gasket configured to cover the weld nut; and an airtight plate configured to press the gasket and attached to the lower surface of the lower housing.

The airtight plate may have a double step structure provided with a space for accommodating the gasket and a space for accommodating the weld nut.

An attachment groove may be formed at the lower surface of the lower housing so that the airtight plate assembly is attached thereto.

A depth of the attachment groove may be equal to or greater than a height of a step of the airtight plate.

A head portion of the fastening bolt may be coated with a sealing member.

Meanwhile, in another aspect of the present disclosure, there is also provided a vehicle, comprising the battery pack according to an embodiment of the present disclosure.

Advantageous Effects

According to an embodiment of the present disclosure, the fastening between a plurality of battery modules and between a module stack formed by stacking a plurality of battery modules and a pack housing may be made as simple as possible, and also the structural stability of the battery pack may be improved when vibration/shock is applied thereto.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 3 is an exploded perspective view showing a lower housing employed at a pack housing applied to the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, a schematic structure of a battery pack 1 according to an embodiment of the present disclosure will be described with reference to FIGS. 1 to 4.

Referring to FIGS. 1 to 4, the battery pack 1 according to an embodiment of the present disclosure includes a module stack M, a pack housing 200, a plurality of fastening bolts 300, and a plurality of displacement plates 400.

Figure 2:
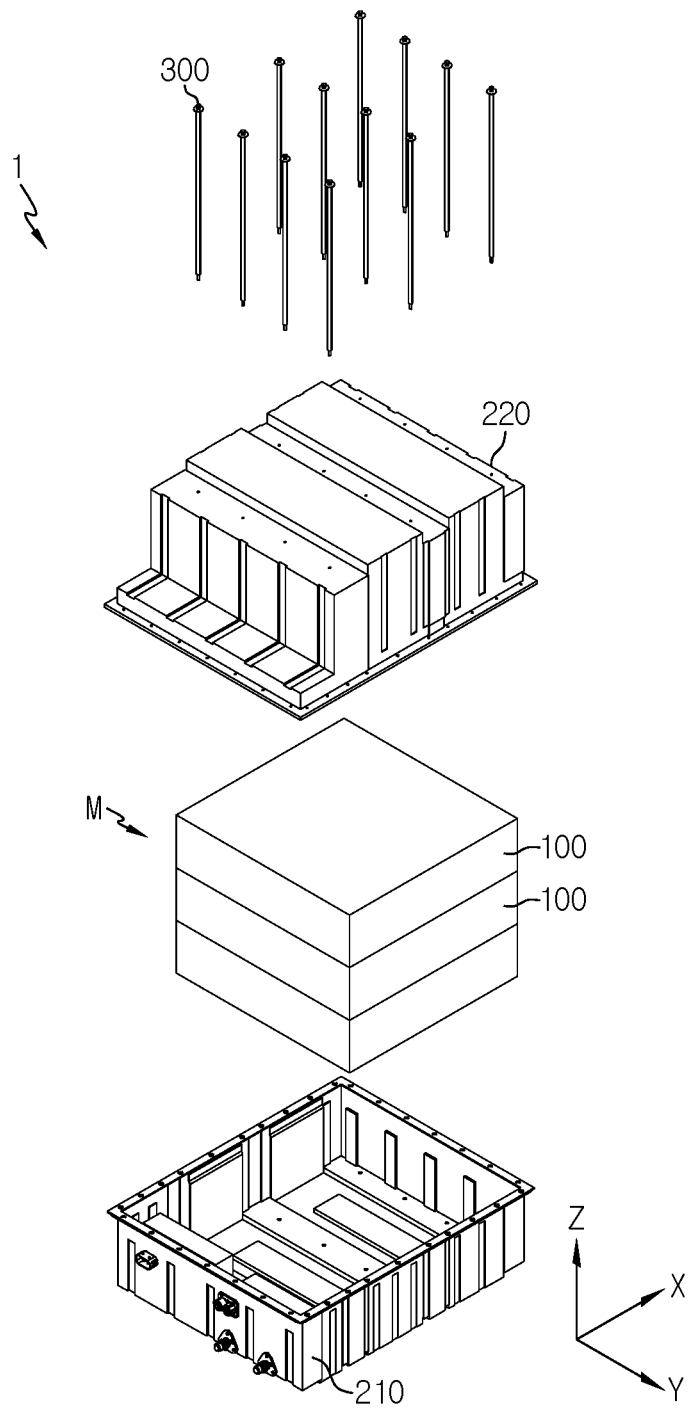
FIG. 2 is an exploded perspective view showing the battery pack of FIG. 1.
Figure 4:
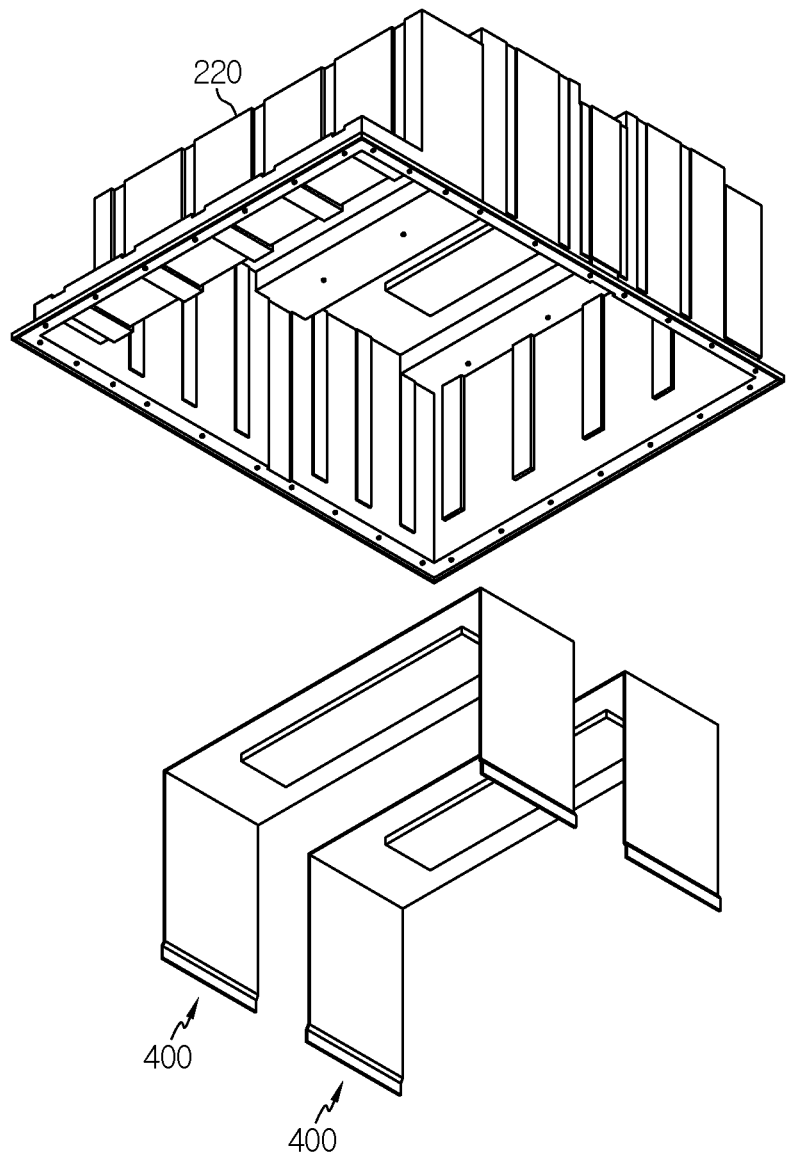
FIG. 4 is an exploded perspective view showing an upper housing employed at the pack housing applied to the present disclosure.

As shown in FIG. 2, the module stack M has a form in which a plurality of battery modules 100 are stacked. Although not specifically shown in the drawings, each battery module 100 may include a plurality of battery cells electrically connected to each other, and may also further include a plurality of BMSs for grouping the plurality of battery cells and managing charging and discharging for each group.

As shown in FIG. 2, the pack housing 200 includes a lower housing 210 for supporting a lower portion of the module stack M and an upper housing 220 for covering an upper portion of the module stack M and coupled to the lower housing 210.

Figure 1:
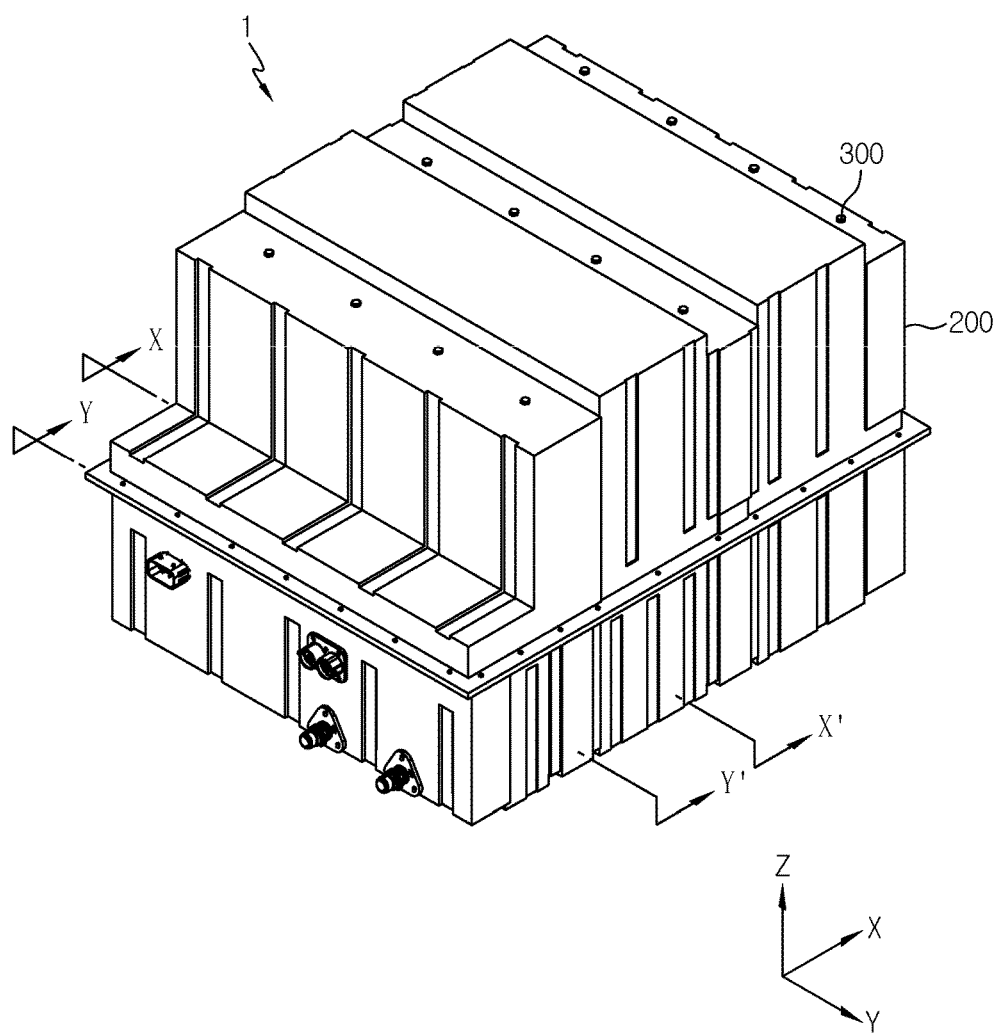
FIG. 1 is a perspective view showing a battery pack according to an embodiment of the present disclosure.

As shown in FIGS. 1 and 2, the plurality of fastening bolts 300 have a shape of a long bolt, and may pass through the upper housing 220, the module stack M and the lower housing 210 in sequence so that the module stack M is fixed to the pack housing 200. In addition, the fastening bolt 300 may serve to fasten the plurality of battery modules 100 to each other.

The displacement plate 400 is coupled to inner sides of the lower housing 210 and the upper housing 220. When the module stack M is inserted into the pack housing 200, the displacement plate 400 may elastically press the module stack M to minimize the movement of the module stack M inside the pack housing 200. In consideration of the function of the displacement plate 400, the displacement plate 400 may be provided in plural along a longitudinal direction of the battery pack 1 (a direction parallel to the X axis of FIGS. 1 and 2) for stable fixing of the module stack M.

A more specific structure and function of the displacement plate 400 will be described in detail below with reference to FIG. 5 along with FIGS. 1 to 4.

Referring to FIGS. 1 to 5, the displacement plate 400 includes a pair of pressing plates 410 configured to face an inner surface of a sidewall of the pack housing 200 and a connection plate 420 configured to connect the pair of pressing plates 410 to each other and face a bottom surface of the pack housing 200. The pair of pressing plates 410 press the module stack M in contact with both side surfaces of the module stack M, and the connection plate 420 is fixed to the bottom surface of the pack housing 200 by welding and/or bolting to limit the movement of the module stack M.

Here, the bottom surface of the pack housing 200 means a surface parallel to the X-Y plane of FIGS. 1 and 2, and refers to a surface facing the lower surface of the module stack M among the inner surfaces of the lower housing 210 and a surface facing the upper surface of the module stack M among the inner surfaces of the upper housing 220.

Figure 5:
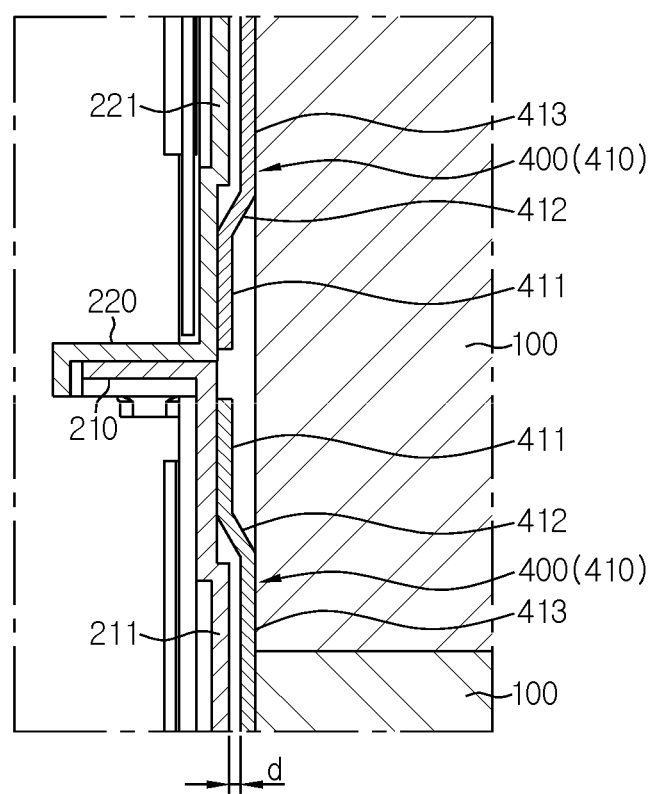
FIG. 5 is a partially enlarged view showing a section, taken along the line X-X of FIG. 1.
Figure 6:
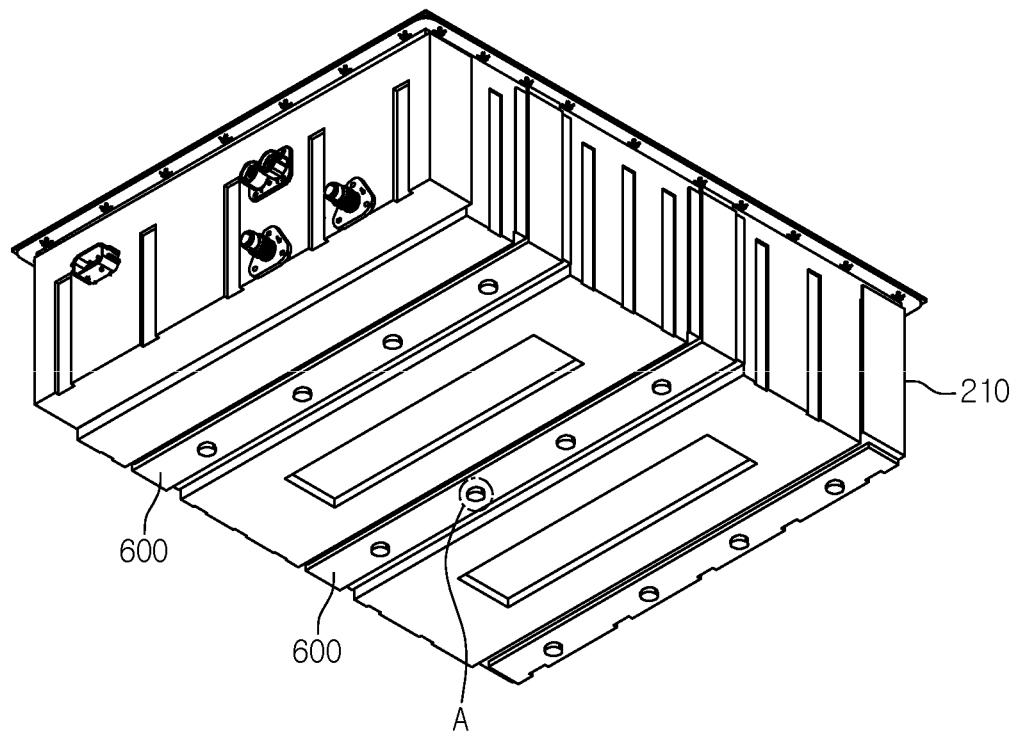
FIG. 6 is a diagram showing a lower surface of the lower housing applied to the battery pack according to an embodiment of the present disclosure.

Referring to FIG. 5, the pressing plate 410 includes a support portion 411, a slope portion 412 and an elastic pressing portion 413 integrally connected to each other. The support portion 411 contacts the inner surface of the sidewall of the pack housing 200 and is disposed parallel to the inner surface. The slope portion 412 is bent to extend from one end of the support portion 411 toward the inside of the pack housing 200. The elastic pressing portion 413 extends parallel to the support portion 411 from one end of the slope portion 412 away from the support portion 411 and presses the module stack M by an elastic restoring force.

Due to the slope portion 412, a gap is generated between the elastic pressing portion 413 and the inner surface of the sidewall of the pack housing 200, and this gap may cause bending of the elastic pressing portion 413 when the module stack M is inserted. This bending of the elastic pressing portion 413 generates an elastic restoring force, and thus the pair of elastic pressing portions 413 located at both sides of the module stack M press the module stack M toward the center of the battery pack 1.

In order to realize the elastic pressing action of the elastic pressing portion 413, the width between the pair of elastic pressing portions 413 facing each other is preferably equal to or slightly smaller than the width of the module stack M (the length extending along a direction parallel to the Y-axis direction in FIGS. 1 and 2). In addition, in consideration of the ease of insertion of the module stack M, the width between the pair of support portions 411 facing each other is preferably slightly greater than the width of the module stack M.

In addition, the bent region between the slope portion 412 and the elastic pressing portion 413 may have a rounded shape. In this case, when the module stack M is inserted, the risk of damage to the module stack M caused by the contact between the module stack M and the pressing plate 410 may be minimized, and more smooth insertion is possible.

Meanwhile, the pack housing 200 may include a plurality of support beads 211, 221 protruding from an inner surface at a side thereof. Specifically, the lower housing 210 includes a plurality of first support beads 211 protruding from the inner surface thereof and facing the inner surface of the elastic pressing portion 413 in a state of being spaced apart therefrom. Similarly, the upper housing 220 includes a plurality of second support beads 221 protruding from the inner surface thereof and facing the inner surface of the elastic pressing portion 413 in a state of being spaced apart therefrom.

The support beads 211, 221 are provided to prevent excessive deformation of the elastic pressing portion 413. A battery pack for a vehicle is frequently exposed to continuous vibrations and shocks during use. When such vibrations and shocks occur, the elastic pressing portion 413 of the displacement plate 400 causes bending deformation to serve as a buffer for mitigating the shock applied to the module stack M.

A distance d between the support bead 211, 221 and the elastic pressing portion 413 after insertion of the module stack M may be determined in consideration of the weight and size of the battery pack 1 and an expected maximum vibration to be applied to the applied application. That is, in consideration of these factors, the height of the support beads 211, 221 and/or the bending angle of the slope portion 412 may be determined.

Next, an airtight structure that may be selectively applied to the battery pack 1 according to an embodiment of the present disclosure will be described with reference to FIGS. 6 to 11.

The battery pack 1 according to an embodiment of the present disclosure may further include a weld nut 500 and an airtight plate assembly 600, in addition to the components described above, and also may further include a sealing member S coated on the fastening bolt 300.

Figure 7:
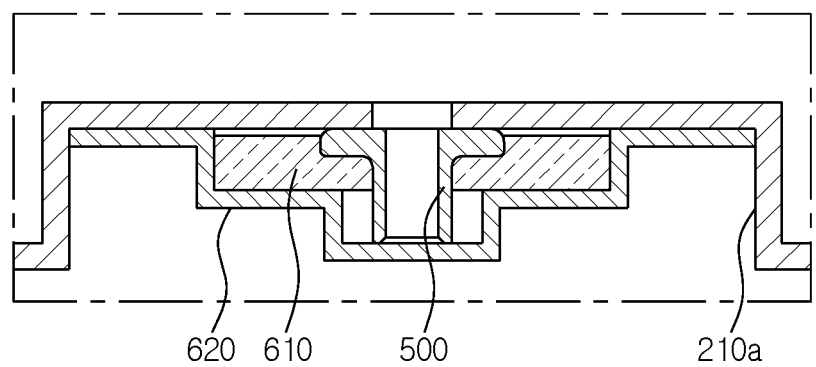
FIG. 7 is a diagram showing an inner structure of the region A of FIG. 6.
Figure 8:
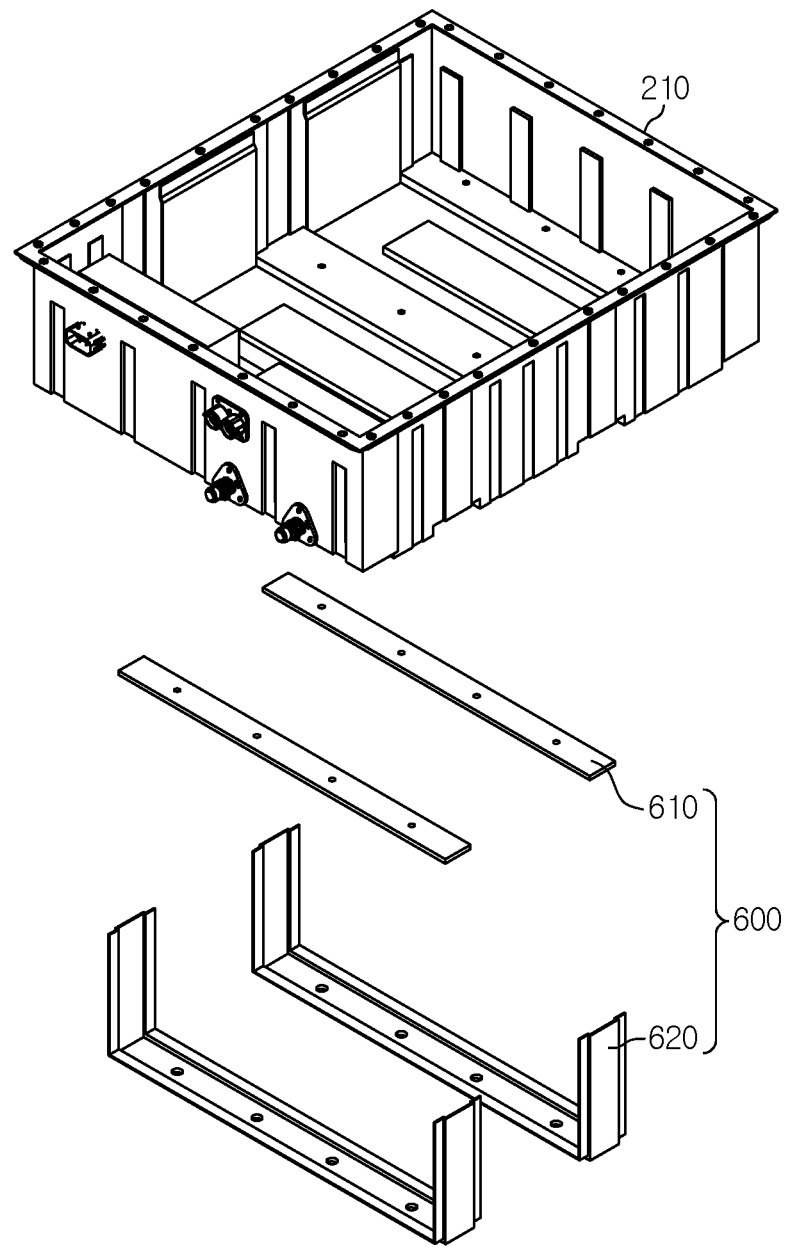
FIG. 8 is an exploded perspective view showing the lower housing of FIG. 6.
Figure 9:
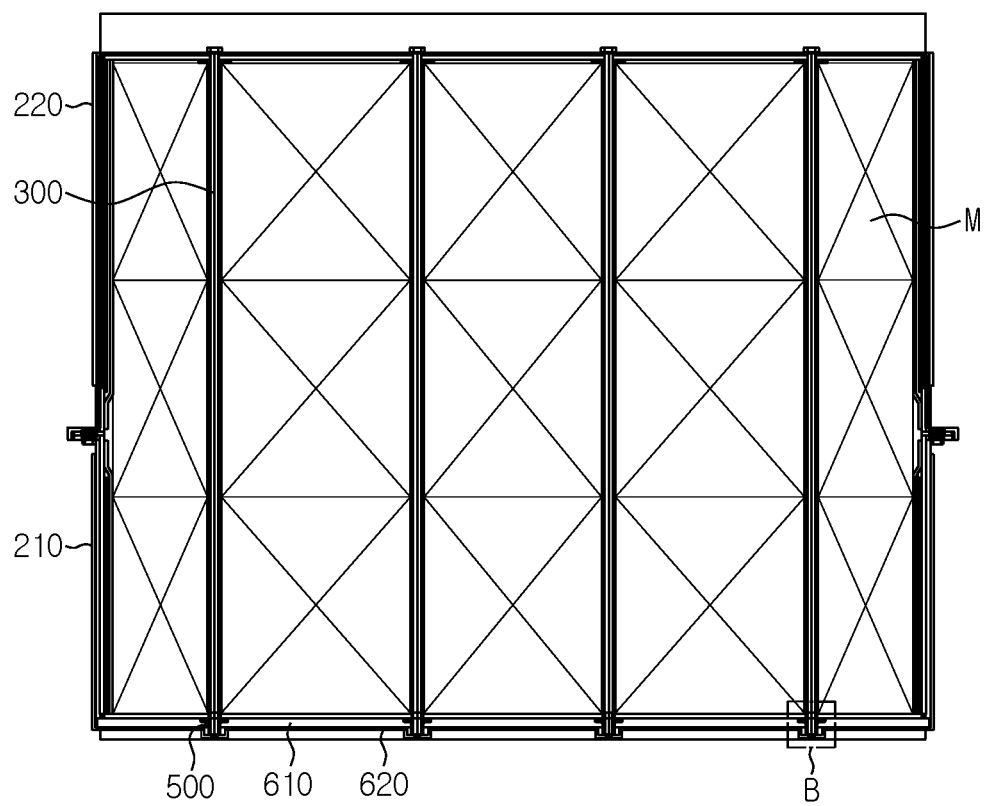
FIG. 9 is a diagram showing a section, taken along the line Y-Y of FIG. 1.
Figure 10:
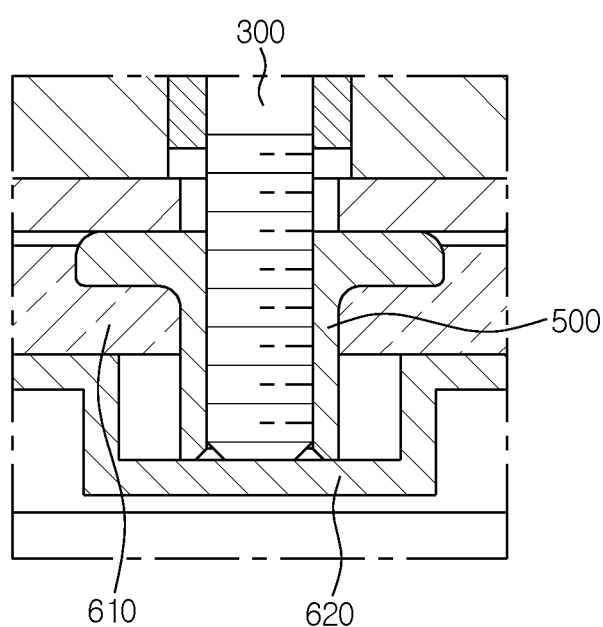
FIG. 10 is a partially enlarged view showing a region B of FIG. 9.

As shown in FIG. 7, the weld nut 500 is attached to the bottom surface of the lower housing 210 (see FIGS. 2 and 3) by welding. The weld nut 500 is attached at a position corresponding to a through hole formed in the bottom surface of the lower housing 210 so as to be coupled with the fastening bolt 300. In addition, the weld nut 500 is located inside a gasket 610 and an airtight plate 620 attached to the lower housing 210. The weld nut 500 is located inside the gasket 610 and the airtight plate 620 as above in order to prevent external foreign matter or moisture from penetrating into the inside of the pack housing 200 due to the through hole formed in the lower housing 210 and thus reducing the lifespan of the battery pack 1 or deteriorating the performance of the battery pack 1.

The airtight plate assembly 600 is inserted into an attachment groove 210a formed at the lower surface of the lower housing 210 and is fixed to an inner bottom surface of the attachment groove 210a by welding or the like. The airtight plate assembly 600 includes a gasket 610 and an airtight plate 620. The gasket 610 surrounds the periphery of the weld nut 500 attached by welding to the lower surface of the lower housing 210 and is interposed between the weld nut 500 and the airtight plate 620 to prevent foreign matter or moisture from penetrating into the gap between the weld nut 500 and the bottom surface of the lower housing 210. The airtight plate 620 covers the gasket 610 and the weld nut 500 inside the attachment groove 210a and is fixed to the bottom surface of the lower housing 210 by welding or the like to primarily prevent foreign matter and/or moisture from penetrating.

The airtight plate 620 presses the gasket 610 and is attached to the lower surface of the lower housing 210. In addition, the airtight plate 620 may have a double step structure provided with a space in which the gasket 610 may be accommodated and a space in which the weld nut 500 may be accommodated. However, the depth of the attachment groove 210a is preferably identical to or greater than the height of the airtight plate 620 according to the double step structure. This is to prevent energy density loss caused by the formation of the airtight plate 620.

Figure 11:
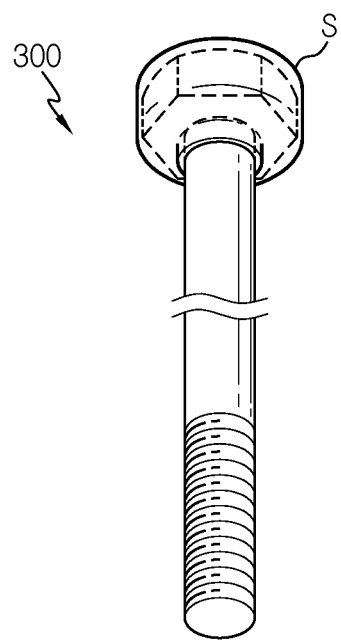
FIG. 11 is a diagram showing a fastening bolt applied to the present disclosure.

Meanwhile, referring to FIG. 11, the fastening bolt 300 may have a sealing member S coated on the surface of a head portion thereof in order to minimize the penetration of foreign matter and/or moisture through the hole formed on the upper portion of the pack housing 200, namely the through hole formed in the upper housing 220. The sealing member S may employ a material with elasticity, for example a urethane material.

As described above, in the case of the battery pack 1 according to an embodiment of the present disclosure, if vibration and/or shock is applied to the battery pack 1, the displacement plate 400 installed at the pack housing 200 may hole the module stack M to be well fixed inside the pack housing 200 without shock. Accordingly, the battery pack 1 according to an embodiment of the present disclosure may have robustness that is not easily damaged or defected even by vibration and/or shock.

In addition, since the battery pack 1 according to an embodiment of the present disclosure has a structure capable of fastening each component of the module stack M and the pack housing 200 together by using the weld nut 500 fixed in advance to the outer side of the pack housing 200 and the fastening bolt 300 fastened to the weld nut 500 through the pack housing 200 and the module stack M at once, it is possible to improve fastening reliability and reduce manufacturing cost.

In addition, since the battery pack 1 according to an embodiment of the present disclosure has a structure that prevents external foreign matter and/or moisture from penetrating through the hole formed at the outer side of the pack housing 200, it is possible to reduce the fear of performance degradation during use of the battery pack.

Meanwhile, a vehicle according to an embodiment of the present disclosure includes the battery pack according to an embodiment of the present disclosure as described above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack, comprising:
   a module stack in which a plurality of battery modules are stacked;
   a pack housing having a lower housing supporting the module stack at a lower side thereof and an upper housing coupled to the lower housing and covering an upper side of the module stack; and
   a plurality of displacement plates, each displacement plate being coupled to inner sides of the lower housing or the upper housing, each displacement plate being configured to elastically press the module stack, each displacement plate including a pair of pressing plates facing an inner surface of a sidewall of the pack housing and a connection plate connecting the pair of pressing plates to each other and facing a bottom surface of the pack housing.

2. The battery pack according to claim 1, wherein each pressing plate includes:
   a support portion disposed parallel to the inner surface and contacting the inner surface of the sidewall of the pack housing;
   a slope portion extending from one end of the respective support portion toward an inside of the pack housing; and
   an elastic pressing portion extending parallel to the support portion from one end of the respective slope portion away from the support portion, the elastic pressing portion configured to press the module stack by using an elastic restoring force, and
   wherein the connection plate connects a pair of elastic pressing portions to each other.

3. The battery pack according to claim 2, wherein each of the lower housing and the upper housing includes a support bead protruding from the inner surface of the sidewall of the respective lower housing or the respective upper housing and facing an inner surface of an adjacent one of the elastic pressing portions, the support beads being spaced apart from the inner surface of the sidewall of the pack housing.

4. The battery pack according to claim 2, wherein each displacement plate has first and second bent regions between the respective slope portion and the respective elastic pressing portion, each bent region having a rounded shape.

5. A battery pack, comprising:
   a module stack in which a plurality of battery modules are stacked;
   a pack housing having a lower housing supporting the module stack at a lower side thereof and an upper housing coupled to the lower housing and covering an upper side of the module stack;
   a plurality of displacement plates, each displacement plate being coupled to inner sides of the lower housing or the upper housing, each displacement plate being configured to elastically press the module stack;
   a plurality of fastening bolts penetrating through the pack housing and the module stack; and
   a plurality of weld nuts fixed to a lower surface of the lower housing and coupled with the fastening bolts.

6. The battery pack according to claim 5, further comprising:
   a plurality of airtight plate assemblies each attached to the lower surface of the lower housing and providing an accommodation space for a respective one of the weld nuts.

7. The battery pack according to claim 6,
   wherein each airtight plate assembly includes:
   a gasket covering the respective weld nut; and
   an airtight plate pressing the gasket and attached to the lower surface of the lower housing.

8. The battery pack according to claim 7, wherein each airtight plate has a double step structure having a space therein for accommodating the respective gasket and a space therein for accommodating the respective weld nut.

9. The battery pack according to claim 8, wherein the lower surface of the lower housing has an attachment groove therein that is attached to a respective one of the airtight plates.

10. The battery pack according to claim 9, wherein a depth of each attachment groove is equal to or greater than a height of a step of the respective airtight plate.

11. The battery pack according to claim 5, wherein a head portion of each fastening bolt is coated with a sealing member.

12. A vehicle comprising the battery pack according to claim 1.

* * * * *